(12) United States Patent
Hur et al.

(10) Patent No.: US 7,613,141 B2
(45) Date of Patent: Nov. 3, 2009

(54) BLUETOOTH BROADCASTING METHOD

(75) Inventors: Jeen Hur, Daejon (KR); Sangbaek Han, Daejon (KR); Sun-Hee Kim, Seoul (KR); Seong-Su Park, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 690 days.

(21) Appl. No.: 10/736,963

(22) Filed: Dec. 15, 2003

(65) Prior Publication Data

US 2004/0148426 A1 Jul. 29, 2004

(30) Foreign Application Priority Data

Dec. 21, 2002 (KR) .................... 10-2002-0082166

(51) Int. Cl.
*H04H 20/71* (2008.01)
(52) U.S. Cl. .................... 370/312; 370/329; 370/348; 370/443; 370/458; 455/41.2; 709/208
(58) Field of Classification Search ............. 370/310, 370/328, 329, 345, 349, 229–230, 321–322, 370/336–337, 347–348, 442–443, 458, 312, 370/476; 455/39, 41.2, 434; 375/130, 132, 375/141; 709/208–211, 244
See application file for complete search history.

(56) References Cited

U.S. PATENT DOCUMENTS 6,366,622 B1 *   4/2002   Brown et al. ................. 375/322
7,009,960 B2 *   3/2006   Ho ............................... 370/347
7,016,336 B2 *   3/2006   Sorensen ..................... 370/351
7,203,483 B2 *   4/2007   Park ........................ 455/412.1

(Continued)

FOREIGN PATENT DOCUMENTS

KR    10-2002-0069013    8/2002

OTHER PUBLICATIONS

Bhagwat, P., "Bluetooth: technology for short-range wireless apps," Internet Computing, IEEE , vol. 5, No. 3, pp. 96-103, May/Jun. 2001.*

(Continued)

*Primary Examiner*—Kwang B Yao
*Assistant Examiner*—Jeffrey Rutkowski
(74) *Attorney, Agent, or Firm*—Blakely Sokoloff Taylor & Zafman

(57) ABSTRACT

The present invention provides an efficient data transmission method in BLUETOOTH broadcasting. The method of BLUETOOTH broadcasting generates a first broadcast packet and determines whether a slot is included in an access window. In a case where the slot is not included in the access window, a service interface (SI) information value is set to the assignment information of the slot. The first broadcast packet is then transmitted. A second broadcast packet is then generated and it is determined whether a slot is included in the access window. If the slot is not included in the access window, the SI information value is set to zero. The second broadcast packet is then transmitted. A slave receives the broadcast packets and obtains the SI information values. It is then determined whether the slave transmits data at the next odd numbered slot.

6 Claims, 5 Drawing Sheets

U.S. PATENT DOCUMENTS

| | | | |
|---|---|---|---|
| 2001/0005368 A1* | 6/2001 | Rune | 370/390 |
| 2001/0010689 A1* | 8/2001 | Awater et al. | 370/344 |
| 2002/0150145 A1* | 10/2002 | Alriksson et al. | 375/132 |
| 2003/0063655 A1 | 4/2003 | Young | |

OTHER PUBLICATIONS

Kyunghun Jang, et al.; "Reliable Delivery of Broadcast Packet in Bluetooth"; 0-7803-Jun. 1, 2001 IEEE (pp. 1119-1123).

* cited by examiner

BLUETOOTH BROADCASTING METHOD

FIELD OF THE INVENTION

The present invention is related to a method of BLUETOOTH broadcasting; and, more particularly, to a method of BLUETOOTH broadcasting for increasing data transmission efficiency by allowing a slave to transmit data while a master is broadcasting, and a computer readable recording medium for executing the same method.

PRIOR ART OF THE INVENTION

BLUETOOTH is a short-range radio link intended to replace cables connecting portable or fixed electric devices. The BLUETOOTH system provides a point-to-point connection or a point-to-multipoint connection. One BLUETOOTH unit acts as the master of a piconet, whereas the other units act as slaves. In the point-to-multipoint connection, the channel is shared among several BLUETOOTH units. The channel is divided into time slots, each 625 microsecond (.mu.s) in length. The master unit transmits data in an even number of slots and slave units transmit data in an odd number of slots. Up to seven slaves can be active in the piconet. Active member addresses (AM_ADDR) 1 to 7 are given to the active slaves.

An asynchronous connection-less (ACL) link provides a packet-switched connection between the master and all active slaves participating in the piconet. A slave is permitted to return an ACL packet on the slave-to-master slot if it has been addressed in the preceding master-to-slave slot.

FIGS. 5A, 5B and 5C are diagrams showing structures of BLUETOOTH packet header and payload of ACL packet.

Referring to FIGS. 5A, 5B and 5C the header contains link control information and consists of 6 fields: 3-bit active member address (AM_ADDR), 4-bit type code (TYPE), 1-bit flow control (FLOW), 1-bit acknowledge indication (ARQN), 1-bit sequence number (SEQN) and 8-bit header error check (HEC). The AM_ADDR represents a member address and it is used to distinguish the active members participating on the piconet. In the piconet, one or more slaves are connected to a single master. To identify each slave separately, a temporary 3-bit address is assigned to each slave to be used when the slave is active. Packets exchanged between the master and the slave all carries the AM_ADDR. That is, the AM_ADDR of the slave is used in both master-to-slave packets and the slave-to-master packets. The all-zero address is reserved for broadcasting packets from the master to the slaves. Sixteen different types of packets can be distinguished as shown in Table 1.

TABLE 1

| Segment | TYPE Code $b_3b_2b_1b_0$ | Slot Occupancy | SCO Link | ACL Link |
|---|---|---|---|---|
| 1 | 0000 | 1 | NULL | NULL |
|  | 0001 | 1 | POLL | POLL |
|  | 0010 | 1 | FHS | FHS |
|  | 0011 | 1 | DM1 | DM1 |
| 2 | 0100 | 1 | Undefined | DH1 |
|  | 0101 | 1 | HV1 | Undefined |
|  | 0110 | 1 | HV2 | Undefined |
|  | 0111 | 1 | HV3 | Undefined |
|  | 1000 | 1 | DV | Undefined |
|  | 1001 | 1 | Undefined | AUX1 |
| 3 | 1010 | 3 | Undefined | DM3 |
|  | 1011 | 3 | Undefined | DH3 |

TABLE 1-continued

| Segment | TYPE Code $b_3b_2b_1b_0$ | Slot Occupancy | SCO Link | ACL Link |
|---|---|---|---|---|
|  | 1100 | 3 | Undefined | Undefined |
|  | 1101 | 3 | Undefined | Undefined |
| 4 | 1110 | 5 | Undefined | DM5 |
|  | 1111 | 5 | Undefined | DH5 |

The FLOW bit is used for flow control of packets over the ACL link. When the RX buffer for the ACL link in the recipient if the RX buffer is not emptied, a stop indication, i.e., FLOW=0, is returned to stop the transmission of data temporarily. The stop signal only concerns ACL packets. The 1-bit acknowledgement indication ARQN is used to inform the source of a successful transfer of payload data with a cyclic redundancy check (CRC), and be positive acknowledgement (ACK) or negative acknowledgement (NAK). If the reception is successful, an ACK, i.e., ARQN=1, is returned, otherwise a NAK, i.e., ARQN=0, is returned. In inquiry response, the FHS packet is not acknowledged. The SEQN bit provides a sequential numbering scheme to order the data packet stream. For each new transmitted packet that contains data with CRC, the SEQN bit is inverted. It is required to filter out retransmissions at the destination; if retransmission occurs due to a failing ACK, the destination receives the packet twice. By comparing the SQEN of consecutive packets, correctly received retransmissions can be discarded. The HEC is 8-bit header-error-check to check the header integrity.

A broadcasting method defined in BLUETOOTH specification 1.1 is explained below with reference to FIG. 5.

Referring to FIGS. 5A, 5B and 5C, 3 bits from least significant bit (LSB) is used as the AM_ADDR 1 to 7, and a packet header that has all zeros of AM_ADDR bit is used for broadcasting to all slaves. When a master is broadcasting to all slaves, the slaves receive "0" in AM_ADDR and do not transmit in odd number slots. FLOW, ARQN and SEQN do not have significant meaning and are wasted during the master is broadcasting to all slaves. Once the slave receives a poll packet or a DM1 packet and permission for transmission, the slave can transmit data. Because the slave cannot transmit data until the slave receives permission for transmission, transmission efficiency decreases and power is consumed unnecessarily.

A structure of payload is shown in FIGS. 5A, 5B and 5C. Referring to FIGS. 5A, 5B and 5C, 2 bits are allocated in L_ch for controlling logical link flow. "00" is not defined. "01" means continuous logical flow. "10" means the starting of logical channel. "11" means a LMP message. Flow is a control bit for controlling flow in L2CAP. Flow bit is "1" when an L2CAP receiver buffer is empty. Flow bit is "0" when the L2CAP receiver is not empty. Length shows a length of user data and is 5 bits for short one and 9 bit for long one. However, 4 bits from the $13^{th}$ bit of the payload header of the long packet have not been defined and used yet.

SUMMARY OF THE INVENTION

Therefore, it is an object of the present invention to provide a BLUETOOTH broadcasting method for increasing data transmission efficiency by allowing a slave to transmit data while a master is broadcasting, and a computer readable recording medium for executing the same method.

In accordance with an aspect of the present invention, there is provided a BLUETOOTH broadcasting method, including the steps of: (a) at a master, generating a broadcast packet to include assign information and header information and transmitting the broadcast packet, wherein the assign information includes information about assigning a slave that is available to transmit data at a next odd number of slot when a slot of the broadcast packet is not included in an access window for transmitting, and the header information included in packet headers such as FLOW, ARQN and SEQN contains information about maintaining ACL link between the master and the slave; (b) at the master, generating a broadcast packet by including notification information and transmitting the broadcast packet, wherein the notification information contains information about there is no slave that is available to transmit data at a next odd number of slot when a slot of the broadcast packet is included in an access window for transmitting; and (c) at the slave, receiving the broadcast packet, obtaining the assigning information, header information or notification information included in the broadcast packet and determining whether or not the slave transmits data.

In accordance with another aspect of the present invention, there is provided a computer readable recording medium for storing a program for executing a BLUETOOTH broadcasting method, the BLUETOOTH broadcasting method including the steps of: (a) at a master, generating a broadcast packet to include assign information and header information and transmitting the broadcast packet, wherein the assign information includes information about assigning a slave that is available to transmit data at a next odd number of slot when a slot of the broadcast packet is not included in an access window for transmitting, and the header information included in packet headers such as FLOW, ARQN and SEQN contains information about maintaining ACL link between the master and the slave; (b) at the master, generating a broadcast packet by including notification information and transmitting the broadcast packet, wherein the notification information contains information about there is no slave that is available to transmit data at a next odd number of slot when a slot of the broadcast packet is included in an access window for transmitting; and (c) at the slave, receiving the broadcast packet, obtaining the assigning information, header information or notification information included in the broadcast packet and determining whether or not the slave transmits data.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Other objects and aspects of the invention will become apparent from the following description of the embodiments with reference to the accompanying drawings, which is set forth hereinafter.

Figure 1:
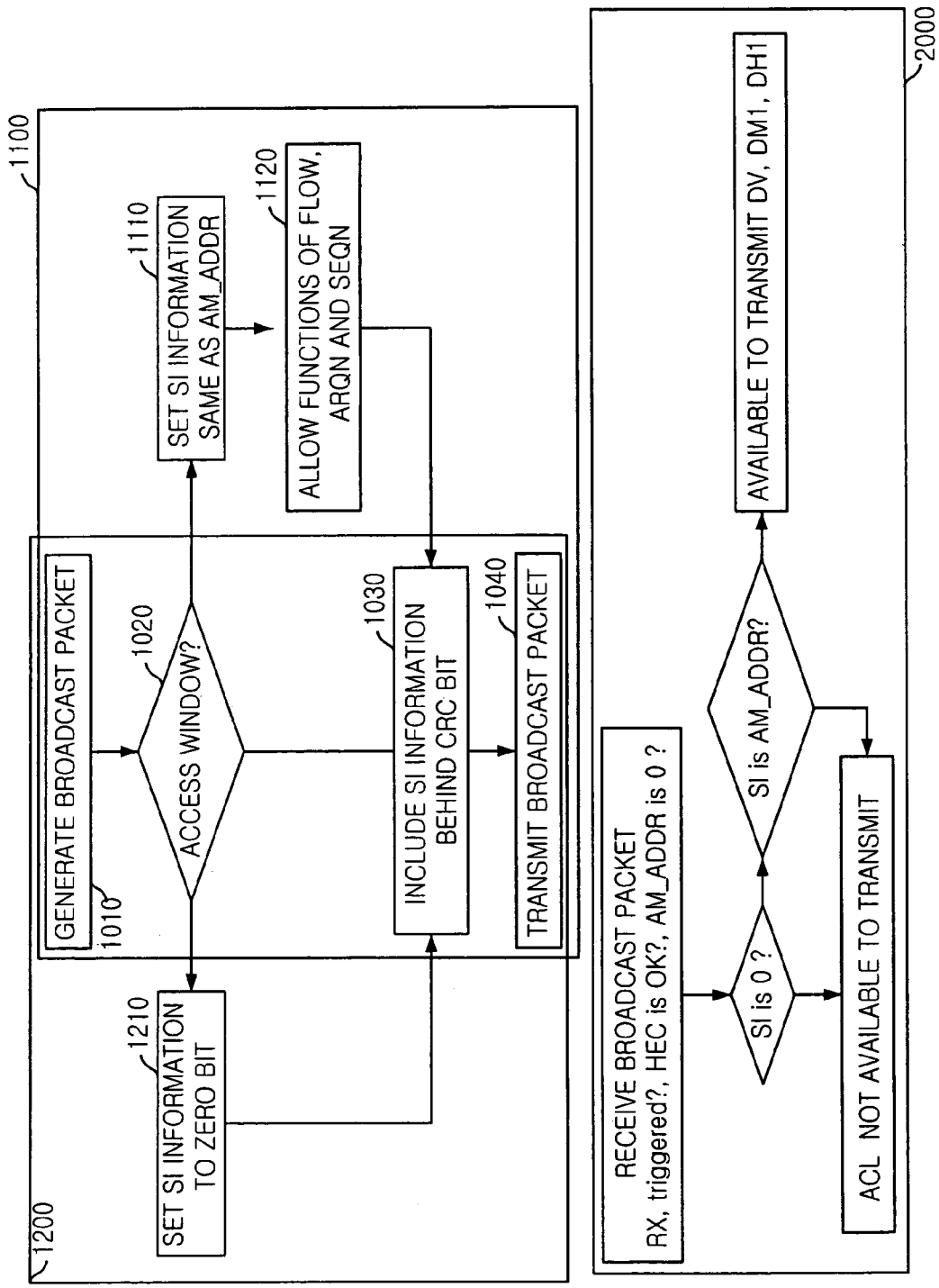
FIG. 1 is a block diagram showing an advanced BLUETOOTH broadcasting method in accordance with a preferred embodiment of the present invention.

FIG. 1 is a block diagram showing an advanced BLUETOOTH broadcasting method in accordance with a preferred embodiment of the present invention. Referring to FIG. 1, the advanced BLUETOOTH broadcasting method in accordance with the present invention includes a first process 1100, a second process 1200 and a third process 2000.

In the first process, at step 1010, a broadcast packet is generated. At step 1020, it is determined whether a slot is included in an access window.

If the slot is not included in the access window at the step 1020, at step 1110, SI value is set to the AM_ADDR of the slot. At step 1120, functions of FLOW, ARQN and SEQN are allowed. At step 1030, a packet is generated by putting the SI information behind a cyclic redundancy check (CRC) bit. Then, at step 1040, a broadcast packet is transmitted.

In the second process, at step 1010, a broadcast packet is generated. At step 1020, it is determined whether a slot is included in an access window.

If the slot is not included in the access window at step 1020, at step 1210, the SI information is set to zero. At step 1030, a packet is generated by putting the SI information behind the CRC bit. Then, at step 1040, a broadcast packet is transmitted.

In the third process 2000, the slave receives the broadcast packet and obtains the SI information. Then, it is determined whether the slave transmits data at the next odd number slot.

Operating principles in accordance with the present invention is explained as follows. At step 1010, a length of maximum user data in accordance with the present invention is 1 byte shorter than that of the conventional BLUETOOTH specification so as to give enough time for frequency hopping.

According to the conventional BLUETOOTH specification, a master knows the start and end of the access window. Therefore, function for the step 1020 and the step 1210 is implemented in the master. A function for the step 1110 is also implemented in the master because the master manages AM_ADDRs of the slaves. A function for the step 1120 is implemented as a method of storing the AM_ADDR as the SI information when the ACL link between the master and the slave is activated and a method of obtaining the AM_ADDR when the master chooses the slave in order to broadcast.

A location of the SI information in the BLUETOOTH packet and a forward error correction (FEC) method are important for lower level interoperability. That is, if the SI information in the BLUETOOTH packet is located before the CRC bit, it is advantageous that an embodiment of the present invention can be implanted by revising software of the BLUETOOTH apparatus that applies BLUETOOTH specification 1.1..

However, when the advanced BLUETOOTH apparatus in accordance with the present invention is broadcasting with the conventional BLUETOOTH apparatus that applies the BLUETOOTH specification 1.1, a problem in higher level protocol occurs. Because 9 bits are required for ⅓ FEC of 3 bits-SI information, a length of total broadcast packet may become longer than that of the BLUETOOTH specification 1.1 and it results in shortening the required time for changing frequency in frequency hopping. However, the problem is ignorable because the length of maximum user data for each packet is shorter than that of the BLUETOOTH specification 1.1 and length of the packet is very small when the FEC is not executed in accordance with the present invention.

Figure 2:
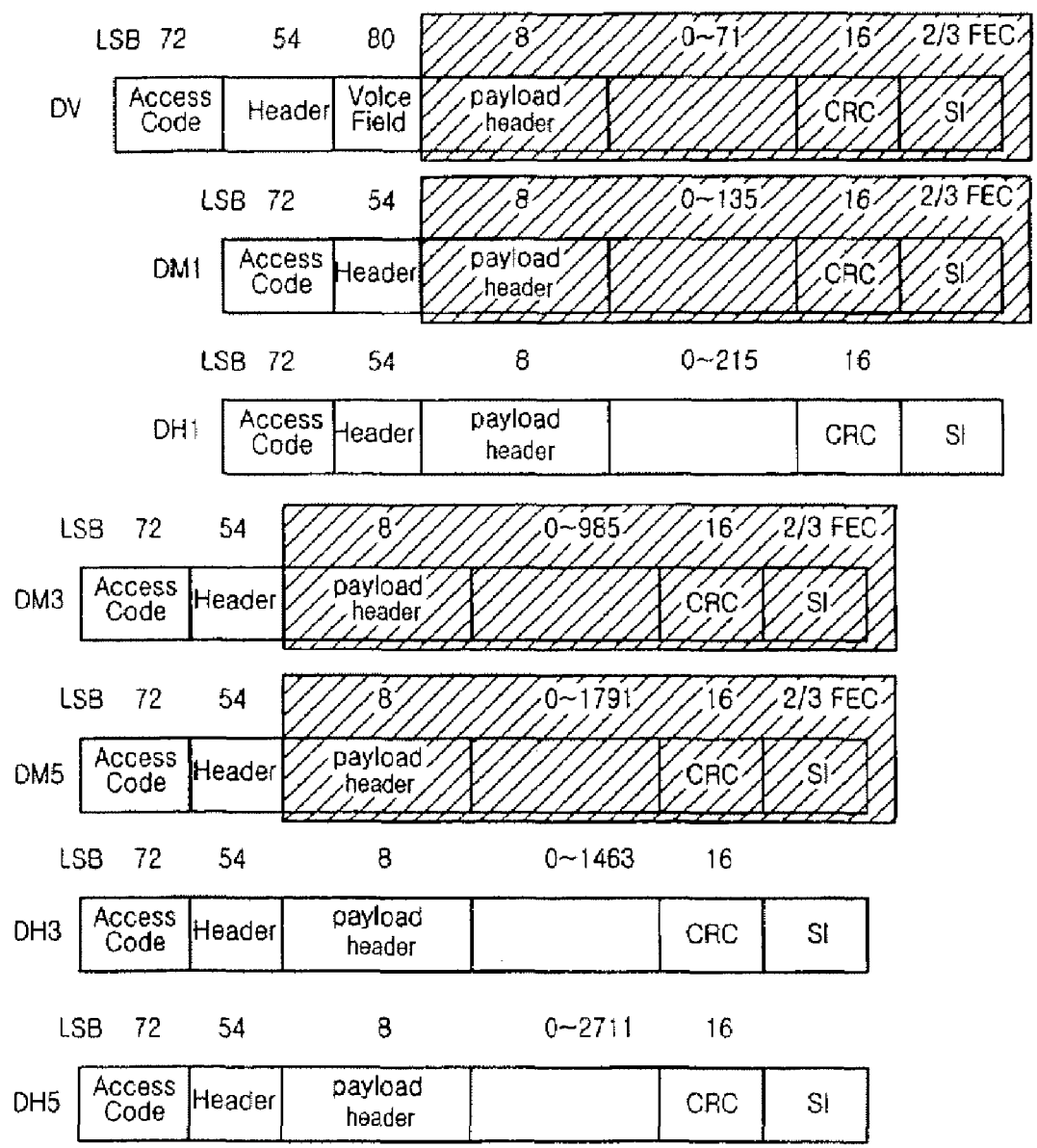
FIG. 2 is an exemplary diagram showing an advanced broadcast packet in accordance with a preferred embodiment of the present invention.
Figure 3:
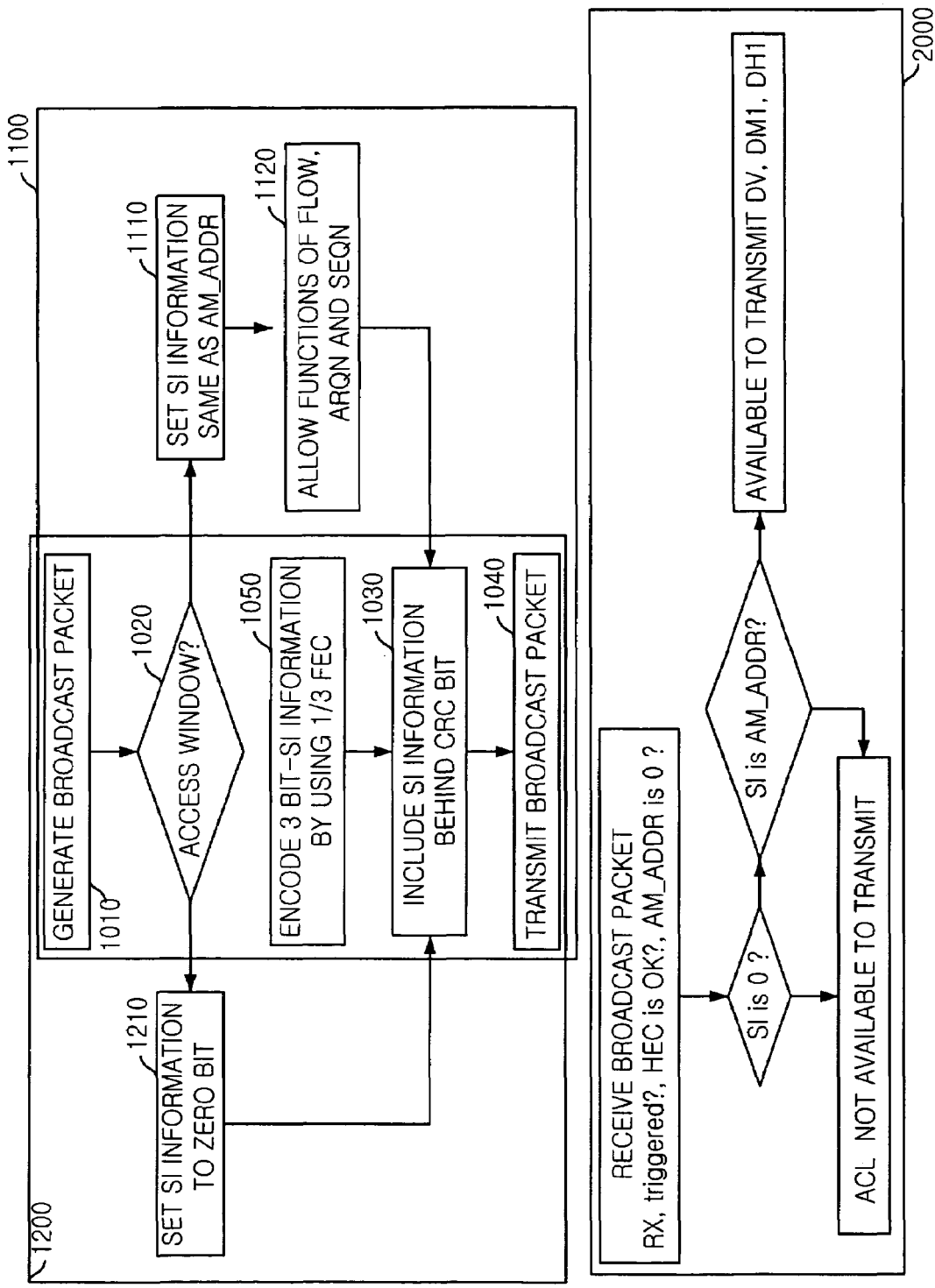
FIG. 3 is a block diagram showing another advanced BLUETOOTH broadcasting method in accordance with a preferred embodiment of the present invention.

FIG. 2 is an exemplary diagram showing an advanced broadcast packet in accordance with a preferred embodiment of the present invention. FIG. 3 is a block diagram showing another advanced BLUETOOTH broadcasting method in accordance with a preferred embodiment of the present invention.

Referring to FIG. 3, the advanced BLUETOOTH broadcasting method in accordance with the present invention includes a first process 1100, a second process 1200 and a third process 2000.

In the first process, at step 1010, a broadcast packet is generated. At step 1020, it is determined whether a slot is included in an access window. If the slot is not included in the access window at the step 1020, at step 1110, SI value is set to the AM_ADDR of the slot. At step 1120, functions of FLOW, ARQN and SEQN are allowed. At step 1050, 3 bit-SI information is ⅓ FEC. At step 1030, a packet is generated by putting the SI information behind a cyclic redundancy check (CRC) bit. Then, at step 1040, a broadcast packet is transmitted.

In the second process, at step 1010, a broadcast packet is generated. At step 1020, it is determined whether a slot is included in an access window. If the slot is not included in the access window at the step 1020, at step 1210, the SI information is set to zero. At step 1050, 3 bit-SI information is ⅓ FEC. At step 1030, a packet is generated by putting the SI information behind a cyclic redundancy check (CRC) bit. Then, at step 1040, a broadcast packet is transmitted.

In the third process 2000, the slave receives the broadcast packet and obtains the SI information. Then, it is determined whether the slave transmits data at the next odd number slot.

Operating principles in accordance with the present invention is explained as follows. According to the BLUETOOTH specification, a master knows the start and end of the access window. Therefore, function for the step 1020 and the step 1210 is implemented in the master. A function for the step 1110 is also implemented in the master because the master manages AM_ADDRs of the slaves. A function for step the 1120 is implemented as a method of storing the AM_ADDR as the SI information when the ACL link between the master and the slave is activated and a method of obtaining the AM_ADDR when the master chooses the slave in order to broadcast. ⅓ FEC function encodes (0,1) into (000,111).

Figure 4A:
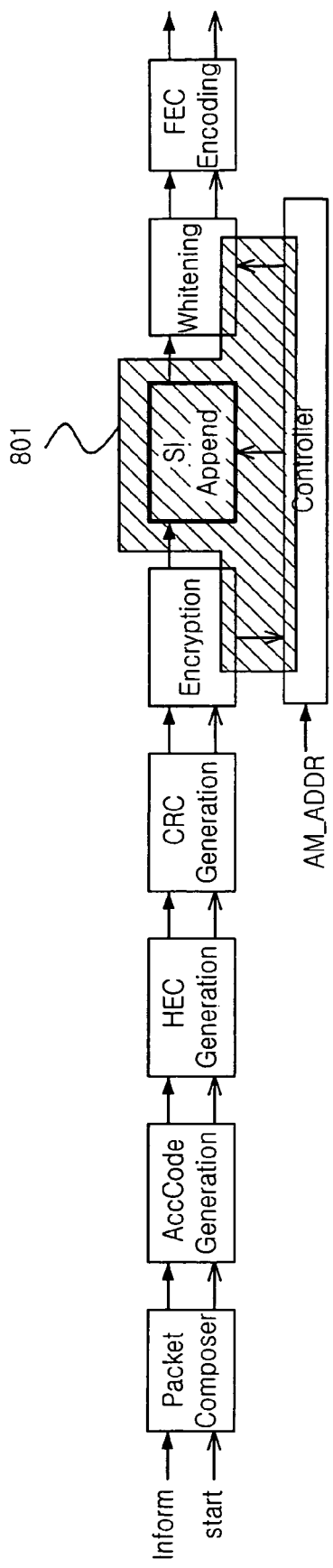
FIG. 4A is a block diagram showing a transmitting unit of a master in accordance with a preferred embodiment of the present invention.
Figure 4B:
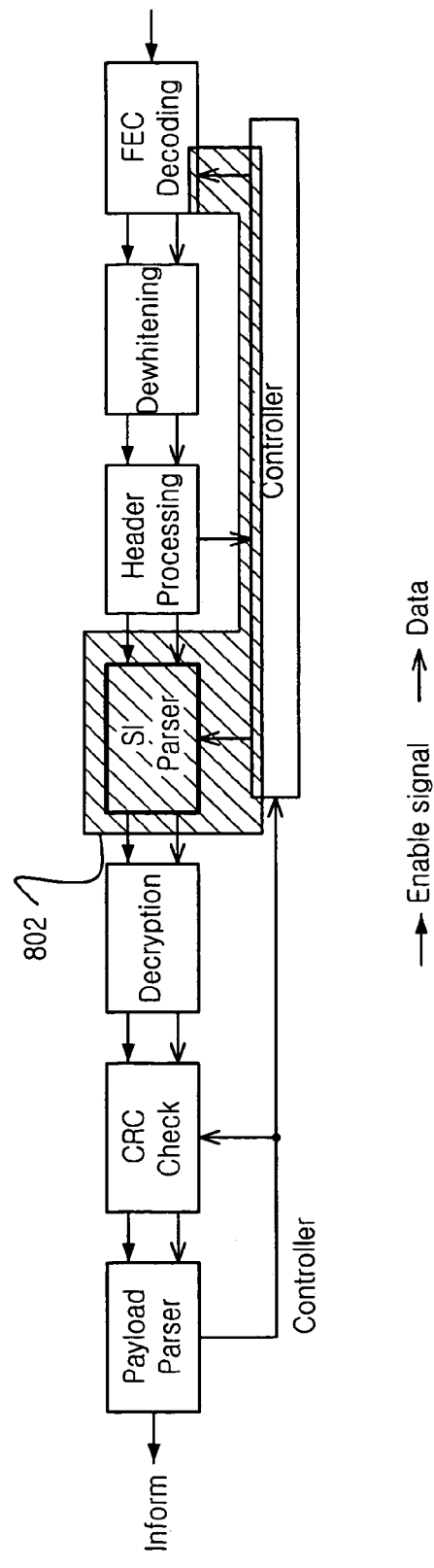
FIG. 4B is a block diagram showing a receiving unit of a slave in accordance with a preferred embodiment of the present invention.
Figure 5A:
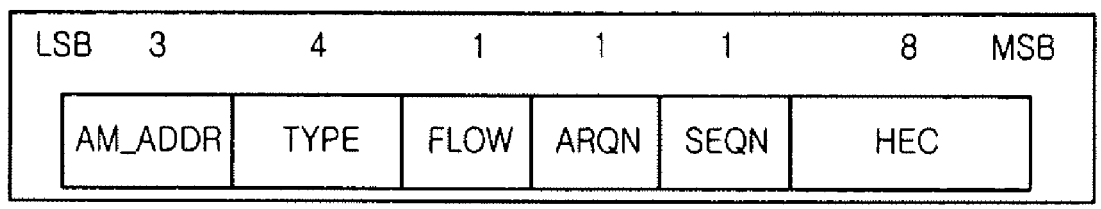
FIGS. 5A, 5B and 5C are diagrams showing structures Of BLUETOOTH packet header and payload of asynchronous connection-less (ACL) packet.
Figure 5B:
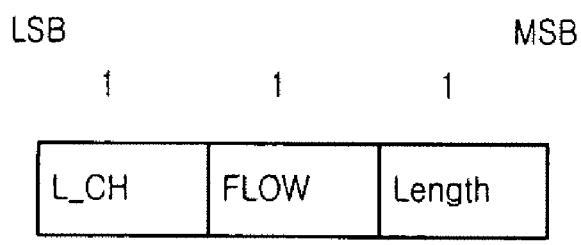
Figure 5C:
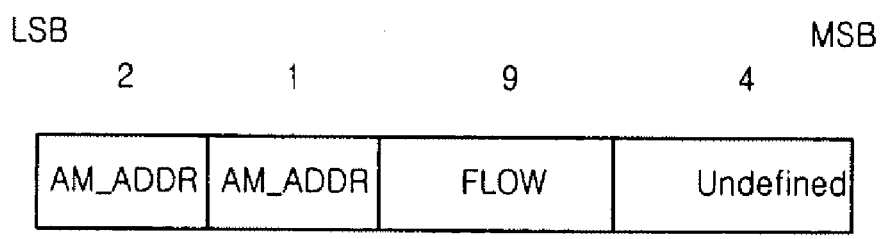

FIGS. 4A and 4B is a block diagram showing a transmitting unit of the master and a receiving unit of the slave in accordance with the embodiment of the present invention.

Referring to FIG. 4A, transmitting procedures of the master includes procedures of channel coding for composing and analyzing access code, header and payload, FEC encoding and whitening, appending the encoded SI field at step 801 and generating an operation control signal for FEC encoding.

Referring to FIG. 4B, receiving procedures of the slave includes procedures of generating an operation control signal for FEC decoding, FEC decoding and de-whitening, parsing decoded SI field at step 802 and channel decoding.

The method of the present invention is interoperable in other BLUETOOTH device that the advanced BLUETOOTH broadcasting method does not support. When the receiving unit does not support the method of the present invention, the receiving unit cannot extract the SI field behind the CRC bit and the LM transfers a payload header and a payload body to higher level layer. The packet received at a higher level layer is the same as the packet to which SI field is not applied. Therefore, the present invention obtains lower level interoperability.

However, it is preferred that the length of maximum user data for the packet of the present invention is 1 bit shorter than that of the BLUETOOTH specification 1.1 because a total length of the BLUETOOTH broadcasting packet of the present invention is lengthened to 15 bits at most.

The method of the present invention can be saved in a computer readable medium, e.g., a CD-ROM, a RAM, a ROM, a floppy disk, a hard disk, and an optical/magnetic disk.

As mentioned above, the present invention can increase data transmission efficiency among the BLUETOOTH devices by reducing the inevitable data transmission inefficiency of the conventional BLUETOOTH broadcasting by half, because the slave can transmit data while the master is broadcasting.

While the present invention has been shown and described with respect to the particular embodiments, it will be apparent to those skilled in the art that many changes and modifications may be made without departing from the spirit and scope of the invention as defined in the appended claims

What is claimed is:

1. A Bluetooth broadcasting method, comprising the steps of:
   (a) at a master, generating a broadcast packet to include assignment information and header information and transmitting the broadcast packet, wherein the assignment information includes information about assigning a slave that is available to transmit data at a next odd slot number when a slot of the broadcast packet is not included in an access window for transmitting, and the header information are included in packet headers comprising FLOW, ARQN and SEQN and the header information contains information about maintaining ACL link between the master and the slave;
   (b) at the master, generating a broadcast packet by including notification information and transmitting the broadcast packet, wherein the notification information contains information to indicate whether no slave is available to transmit data at next odd slot number in response to a slot of the broadcast packet being included in an access window for transmitting, the assignment information is stored behind a CRC bit, wherein the assignment information stored behind the CRC bit is set to an active member address of the slot of the broadcast packet; and
   (c) at the slave, receiving the broadcast packets, obtaining the assigning information, header information or notification information included in the broadcast packet and determining whether or not the slave transmits data.

2. The method as recited in claim 1, wherein an active member address is used for assigning the slave that is available to transmit data, and the active member address having a zero bit value notifies that there is no slave available to transmit data.

3. The method as recited in claim 2, wherein the assignment information and the notification information are stored in a location that cyclic redundancy check is not applied.

4. The method as recited in claim 3, wherein the assignment information and the notification information are ⅓ forward error correction (FEC) coded.

5. The method as recited in claim 4, wherein a maximum length of data in the broadcast packet is 15 bits.

6. A computer readable recording medium for storing a program for executing a Bluetooth broadcasting method, the Bluetooth broadcasting method comprising the steps of:

(a) at a master, generating a broadcast packet to include assignment information and header information and transmitting the broadcast packet, wherein the assignment information includes information about assigning a slave that is available to transmit data at a next odd slot number when a slot of the broadcast packet is not included in an access window for transmitting, the header information included in packet headers including FLOW, ARQN and SEQN contains information about maintaining ACL link between the master and the slave, and the assignment information is stored behind a CRC bit, wherein the assignment information stored behind the CRC bit is set to an active member address of the slot of the broadcast packet;

(b) at the master, generating a broadcast packet by including notification information and transmitting the broadcast packet, wherein the notification information contains information to indicate whether no slave is available to transmit data at the next odd slot number when a slot of the broadcast packet is included in an access window for transmitting; and (c) at the slave, receiving the broadcast packet, obtaining the assigning information, header information or notification information included in the broadcast packet and determining whether or not the slave transmits data.

* * * * *